Dec. 27, 1960

F. E. TAYLOR 2,966,580

BATTERY HAND LAMP

Filed Sept. 24, 1959

INVENTOR

Frank E. Taylor

United States Patent Office 2,966,580
Patented Dec. 27, 1960

2,966,580

BATTERY HAND LAMP

Frank E. Taylor, 1416 S. Wichita St., Wichita 13, Kans.

Filed Sept. 24, 1959, Ser. No. 842,115

1 Claim. (Cl. 240—10.66)

This invention relates to battery hand lamps, and more specifically to new and useful improvements in the design and construction of such lamps with the object of ensuring the operability thereof.

The most common use for hand lamps which are battery operated is to provide light in an emergency, such as a power failure, or where no other form of light is available. It is therefore imperative that such lamps can be relied upon to operate without failure when required. There are several conditions which may readily develop in the well known battery lamp which will prevent its operation. The most common conditions causing failure are, a fused bulb, a loose bulb, a dead battery, corroded terminals, a corroded switch or a leaking battery. Any one of these conditions will cause failure in operation.

It is therefore a primary object of this invention to provide a battery operated hand lamp in which the chance of failure is very considerably reduced.

It is a further object of the invention to provide a battery operated lamp in which each essential component involved in producing illumination is duplicated.

It is yet a further object of the invention to provide a battery operated hand lamp which has a novel push button circuit control, operating two different circuits at the same time.

A still further object of the invention is to provide a battery operated hand lamp which is of simple and efficient construction, and which may be manufactured at low cost.

The invention consists of a casing having two parallel cylindrical grooves disposed along its length and separated by a central rib. Each groove is closed at one end and receives a battery or batteries and a light bulb. A single circuit completing wire made of tempered conductive material provides a resilient contact with one terminal of a battery, and at the same time maintains the other terminal in contact with the bulb. The wire passes along the side of the battery and has a crank shaped projection which protrudes into a hole which passes normal through the central rib. The wire then continues adjacent to the battery to terminate beside the bulb. A tapered operating button passes through the hole formed in the rib, and may be depressed against the crank portion of the wire, thus forcing the terminating portion into electrical contact with the bulb, and closing the circuit. This circuit is duplicated in each cylinder opening.

Further objects and features of this invention will become apparent from the following detailed description of a preferred embodiment thereof, taken in conjunction with the attached drawings wherein.

Like reference numerals indicate corresponding parts throughout the several views in the drawing.

Figure 1:
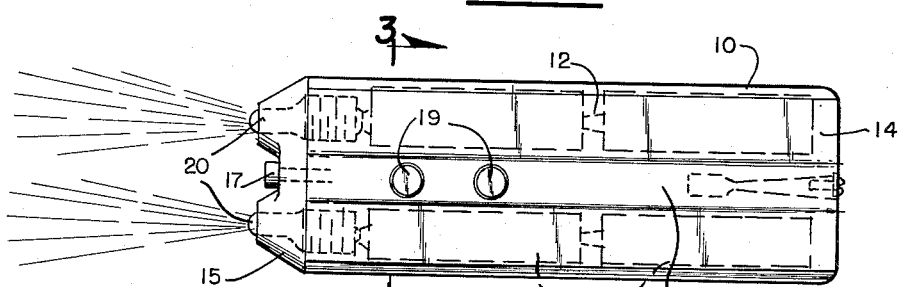
Fig. 1 is a plan view of the complete torch showing the location of batteries and bulbs in broken lines.
Figure 2:
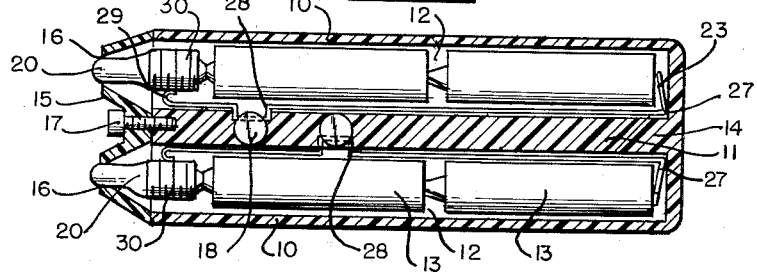
Fig. 2 is another plan view partly in cross section showing further detail of the assembly.
Figure 3:
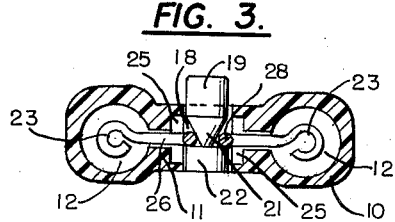
Fig. 3 is a cross sectional elevation taken along the line 3—3 of Fig. 1 showing the detail of the contact switch assembled in the "off" position.
Figure 6:
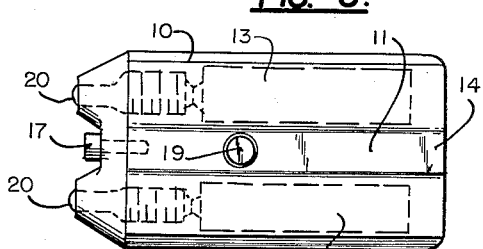
Fig. 6 is a plan view of one embodiment of the torch showing a single control contact switch.

Referring now to the drawing, the numeral 10 represents a casing of generally rectangular shape and cross section. The casing has two cylindrical grooves 12 disposed parallel to each other along the length of the casing, and separated from each other by a central rib 11. At one end the grooves are closed by an end wall 14 and the other ends are constricted by a translucent cap 15 having two bulb openings 16 and a retaining screw 17 which secures the cap to the central rib 11. The rib 11 has one or two holes 18 passing through the rib portion 11 of the casing to receive a contact button 19. The choice of a single or twin operating buttons will depend on the specific embodiment preferred. Figs. 1 and 2 show an embodiment incorporating two separate contact buttons, each operating a separate circuit, whereas Figs. 3 and 6 show a single button operating both circuits simultaneously. Bulbs 20 are located beneath the translucent cap 15 and may be secured in position by a regular screw type holder, not shown on the drawing, or for increased economy may be received in a shaped molding formed on the inner side of the cap 15.

The contact button 19 consists of a round peg having an overall length greater than the width of the rib 11, so that it projects perpendicularly through either side thereof, in sliding relationship with the hole 18. The button tapers inwardly to form a cone 21 and then abruptly returns to the original diameter to terminate in a return button 22.

Figures 4, 5:
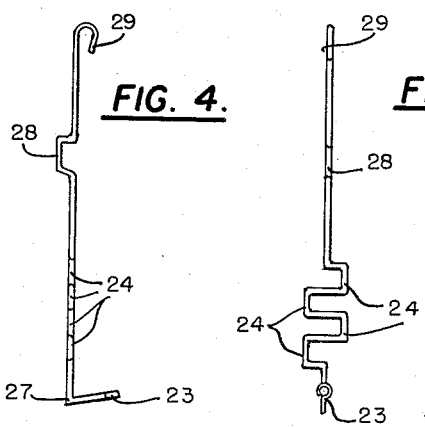
Fig. 4 is a plan view of the circuit completing wire showing the battery terminal and the control switch crank.
Fig. 5 is a side elevation of the circuit completing wire showing the locating ribs.
Figure 7:
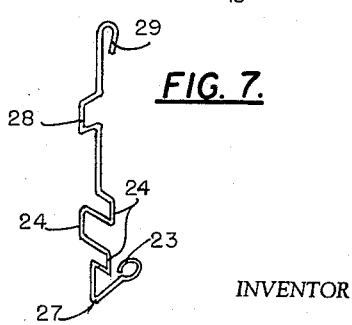
Fig. 7 is a perspective view of the circuit completing wire.

A circuit completing wire shown in Figs. 4, 5 and 7 consists of a tempered conductive wire which is shaped in a novel manner to perform several functions. At one end the wire is bent at 27 through an angle of about 100° to project into the blind end of the groove 12 and terminate in a looped terminal contact 23. The terminal is adapted to springingly engage with the centre of the lower terminal of a battery 13. For the sake of reference, let it be assumed that the above wire projection lies in a horizontal plane. The wire extends parallel with the groove 12 and is further bent to form several crank shaped protrusions 24 disposed normally to the plane of reference. These protrusions, having extremities disposed parallel to each other on either side of the centre line formed by the above reference plane, are slidingly received in a T-shaped groove 25 formed along the length of the central rib, with the base 26 of the T extending into the groove 12. The wire now further extends within the T-shaped groove 25 until reaching the hole 18 at which point a further crank projection 28 is formed in the plane of reference such that the extremity of the projection cuts across the hole 18 near the centre thereof. The wire continues within the T-shaped groove 25 to terminate in a hook shaped end 29 which is disposed adjacent to a terminal 30 of a bulb 20.

If a single contact button is to be adopted, two identical conductor wires are introduced into the groove 25, which will provide two projections 28 disposed across the hole 28 as best seen in Fig. 3.

In the double contact embodiment in which either bulb may be operated independently, the two circuit completing wires will differ only in respect to the location of the crank projection 28 as will be understood by reference to Fig. 2 of the drawing.

The assembly of this twin lamp is very simple, especially from a manufacturing standpoint, there being no welding or permanent attachments involved. The two circuit completing wires are installed first, by sliding the crank protrusions 24 down the T-shaped groove 25 until the portion 27 abuts the end wall 14. The batteries are next slid into position to engage with the sprung terminal 23 of the circuit wire. The contact plunger 19 is now inserted in the hole 18 by displacing the end 29 of the circuit wire, and hence the crank projection 28, inwardly away from interference with the hole. On releasing the displaced wire, the projection 28 will return into the hole and engage the plunger 19 at the apex of the cone 21, thus retaining the plunger with one end projecting outwardly from the casing. The bulbs are now installed in the cap 15 which is secured in position by the retaining screw 17.

When the contact plunger 19 is depressed into the casing, the cone 21 forces the crank projections 28 outwardly to rotate the wire and cause the ends 29 of the wire to pass through the slots 26 into contact with the shell contacts 30, thus forming a closed circuit and lighting the bulbs. If only temporary light is required, the button or plunger 19 may be only slightly depressed such that it will return to the "off" position due to the loading of the crank projections on the cone section 21. Continuous operation is obtained by depressing the plunger down until the crank projections ride on the parallel sides of the plunger 19. This will cause the return button to project beneath the casing to provide a means of returning the switch to the "off" position.

From the above description it will be appreciated that I have provided a battery lamp which may be manufactured at an exceedingly low cost, and in which the chance of complete failure has been made very remote.

Having described my invention in a preferred form, it will be appreciated that some modifications may be made to the precise configuration, without departing from the scope or spirit of the invention as defined by the following claim.

I claim:

A battery operated hand lamp comprising a casing having a groove extending from one end to the other end, a bulb having a base contact and a shell contact, said bulb being disposed so as to face outwardly from said casing, a battery disposed in said groove with one terminal electrically contacting the bulb base contact, a circuit completing wire having one end springingly engaging the other terminal of said battery rotatably supported in a T-shaped groove extending parallel to said battery and having the other end adjacent to and normally out of contact with said bulb shell contact, there being a hole in said casing disposed normal to said groove and adjacent said T-shaped groove, a cranked projection formed in said wire intermediate the ends thereof projecting into said hole, a contact button slidably mounted in said hole for back and forth movement and having the end thereof exteriorly of said casing, and means on said contact button engageable with said projection so that upon execution of movement of said button in one direction said projection is shifted, said wire is rotated in the counter clockwise direction, and said wire other end is moved into contact with said shell contact and upon execution of movement of said button in the other direction said wire is rotated in the other direction, and said wire other end is moved out of contact with said shell contact.

References Cited in the file of this patent

UNITED STATES PATENTS

| | | |
|---|---|---|
| 2,373,306 | Gits | Apr. 10, 1945 |
| 2,374,375 | O'Donnell | Apr. 24, 1945 |
| 2,530,505 | Brill | Nov. 21, 1950 |